(12) United States Patent
Komatsu et al.

(10) Patent No.: US 8,462,475 B2
(45) Date of Patent: Jun. 11, 2013

(54) MULTI-TERMINAL POWER LINE PROTECTION RELAY SYSTEM

(75) Inventors: Chikashi Komatsu, Hitachi (JP);
Mitsuyasu Kido, Hitachinaka (JP);
Hideyuki Yoshioka, Hitachi (JP);
Tokushiro Uno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 66 days.

(21) Appl. No.: 13/159,496

(22) Filed: Jun. 14, 2011

(65) Prior Publication Data

US 2011/0310518 A1     Dec. 22, 2011

(30) Foreign Application Priority Data

Jun. 16, 2010   (JP) ................................. 2010-136757

(51) Int. Cl.
*H02H 7/00*   (2006.01)
(52) U.S. Cl.
USPC ............................................. 361/68; 361/87
(58) Field of Classification Search
None
See application file for complete search history.

(56) References Cited

U.S. PATENT DOCUMENTS

| | | | | |
|---|---|---|---|---|
| 4,322,768 A | * | 3/1982 | Maeda et al. | 361/64 |
| 7,576,963 B2 | * | 8/2009 | Hill et al. | 361/64 |

FOREIGN PATENT DOCUMENTS

JP    7-336874    12/1995

* cited by examiner

*Primary Examiner* — Jared Fureman
*Assistant Examiner* — Terrence Willoughby
(74) *Attorney, Agent, or Firm* — Antonelli, Terry, Stout & Kraus, LLP.

(57) ABSTRACT

A multi-terminal power line protective relay system is provided, which divides a power transmission line having four or more terminals into two or more power line sections composed of three adjacent terminals and portions of the power transmission line lying among the three adjacent terminals and one of the three adjacent terminals being shared by two adjacent power line sections, and includes protective relays at the respective terminals including a current-driven differential protective relay element for detecting a fault occurring in a power line section through current-differential calculation by using measured currents, inter-terminal communication channels linking two protective relays at two different terminals; and intra-terminal communication channels linking two protective relays at each shared terminal. Each protective relay that detected the fault transfers a trip instruction to the other protective relays via the inter-terminal and intra-terminal communication channels and causes the other protective relays to trip circuit breakers.

3 Claims, 5 Drawing Sheets ations, increasing needs for electric power are met with increasing the branches or terminals of transmission line. Consequently, there are transmission lines each having six or more terminals. In addition to this, with the recent trend toward recyclable natural resources, there came to be used an increasing number of distributed power sources such as wind power generators so that the number of the terminals of transmission line will be further increased.

MULTI-TERMINAL POWER LINE PROTECTION RELAY SYSTEM

BACKGROUND OF THE INVENTION

This invention relates to a multi-terminal power line protection system for protecting the power transmission lines constituting a multi-terminal power network.

In general, faults, such as short circuits or ground faults, occurring in a power network are eliminated from the power system as in the following manner. Protective relays are provided for the respective system components such as transmission lines, transformers, buses, generators, etc. which constitute the power system. When a fault occurs in a certain area of a transmission line of the power network, a protective relay covering the area of fault operates to trip a circuit breaker for the area and thereby to isolate the fault area from the rest of the sound network. The most prevalent example of such a protective relay system nowadays is a digitally operated protective relay system in which an algorithm is installed that digitalizes the current and voltage data obtained from the power system and determines system faults through the processing of the current and the voltage data by software.

As a role of the protective relay system for the power network, it is desired to accurately detect a fault in an area of protection which it is supposed to cover, to narrow down the region affected by the fault to the minimum extent possible, and to isolate the fault from the power system rapidly. Therefore, it is ideally desired that the protective relay supposed to operate first in the event of fault should operate as swiftly as possible in response to the fault occurring in the area of protection but not operate in response to a fault occurring outside of the area of protection.

Today, among protective relays used for the protection of power transmission lines that employ a calculation principle for detecting faults and determining the section in which the fault is occurring, most prevalent relays are a distance relay of impedance type which determines whether a fault is within or without the area of protection by calculating the impedance between the relay and the point of the fault on the basis of the data of voltage at a single terminal and of current flowing through the entire transmission line of interest; and a current-driven differential type protective relay which obtains data on currents at all the terminals of the transmission line through sampling and performs necessary arithmetic operations on the basis of Kirchhoff's current law.

Especially, more prevalent is the latter current-driven type differential protective relay which can distinguish a fault occurring within the area of protection from a fault occurring outside of the area of protection. JP-A-7-336874 is known, for example, as an application of such current-driven type differential protective relay to the protection of a multi-terminal power transmission line.

SUMMARY OF THE INVENTION

In order to apply the current-driven type differential protective relays to transmission lines for their protection, it is necessary to aggregate data obtained at the respective terminals of the transmission lines to at least a single station swiftly and also to provide communication apparatus and associated communication channels.

In Japan where the conditions of sites for transforming stations are strict, increasing needs for electric power are met with increasing the branches or terminals of transmission line. Consequently, there are transmission lines each having six or more terminals. In addition to this, with the recent trend toward recyclable natural resources, there came to be used an increasing number of distributed power sources such as wind power generators so that the number of the terminals of transmission line will be further increased.

It is desirable that the current-driven type differential protective relays should be used for the protection of super-high voltage power transmission lines. When it becomes necessary to increase the number of branches in or the number of terminals for the existing transmission line, needs arise for providing communication apparatus and channels for linking all the terminals and protective relays for the current-differential calculations corresponding to the respective terminals. However, there exists an upper limit to the number of available terminals in the transmission line since there is a limit to the capacity of data processing by the hardware and software installed in each protective relay.

Further, when the number of terminals is increased, it is required to retest the existing protective relays, the communication apparatus and the communication channels, and to modify the existing protective relays, and when the number of terminals is required to increase to the extent that an ordinary protective relay system cannot handle that many terminals, it is necessary to renew the protective relays installed at all the terminals.

The object of this invention, which has been made to overcome the above described problems, is to provide a power line protective relay system operating on the current-driven differential principle, that is suitable for the protection of a power transmission line having many terminals and that can easily cope with the increase in the number of terminals.

According to this invention, there is provided a multi-terminal power line protective relay system comprising:

a power transmission line having four or more terminals which is divided into two or more power line sections, each of which is composed of three adjacent terminals and portions of the power transmission line lying among the three adjacent terminals, and at least one of the three adjacent terminals being shared by two of the adjacent power line sections;

protective relays installed at the respective terminals included in the power line sections and each including a current-driven differential protective relay element for detecting a fault occurring in a power line section through current-differential calculation by using currents measured at the terminals included in the power line sections;

inter-terminal communication channels to share data necessary to perform the current-differential calculation in the protective relays; and intra-terminal communication channels each linking two protective relays each being installed at a shared terminal being shared by two of the adjacent power line sections, wherein each protective relay that detected a fault occurring in a power line section transfers a signal indicating the fault to other protective relays via the inter-terminal and the intra-terminal communication channels and causes the other protective relays to trip circuit breakers installed at the terminals.

Further, each protective relay may preferably includes a distance relay element which covers for its distance measurement the region within the power line section extending from the terminal associated with the protective relay to the nearest branch point, and may also preferably detect a fault in a power line section on the basis of the operating output of the current-driven differential protective relay element or the distance relay element.

Still further, each protective relay may preferably be configured digitally; and current data for the current-driven differential protective relay elements belonging to the same power line section need to be synchronously sampled, but current data for the current-driven differential protective relay elements belonging to different power line sections need not be synchronously sampled.

Yet further, the current-driven differential protective relay elements for detecting a fault in a power line section through current-differential calculation by using the currents measured at the terminals belonging to the power line section, estimates a voltage at each branch point associated with each terminal; calculates current flowing into a central branch point from adjacent branch points or current flowing into a terminal corresponding to the central branch point; and detects the fault occurring in the power line section by performing current-differential calculation between the calculated current and the current measured at the terminal corresponding to the central branch point.

Furthermore, the power line section may preferably be made up of three or more adjacent terminals and portions of the power transmission line lying between the adjacent terminals.

In addition, according to this invention, there is provided a multi-terminal power line protective relay system comprising:

a power transmission line having four or more terminals which is divided into a power line section composed of three adjacent terminals and portions of the power transmission line lying among the three adjacent terminals, and at least one terminal excluded from the power line section, the multi-terminal power line protective relay system a first group of protective relays installed at the respective terminals included in the power line sections and each including a current-driven differential protective relay element for detecting a fault occurring in a power line section through current-differential calculation by using currents measured at the terminals included in the power line sections;

inter-terminal communication channels to share data necessary to perform the current-differential calculation in the first group of protective relays;

a second protective relay installed at a terminal excluded from the power line section and including a distance relay element having its measurement area from the excluded terminal to a branch point associated with the excluded terminal;

a third protective relay installed at the terminal of the first group adjacent to the excluded terminal;

a first communication channel for communication between one of the first group protective relays installed at the terminal adjacent to the excluded terminal and the third protective relay; and a second communication channel for communication between the second protective relay and the third protective relay, wherein each protective relay that detected a fault occurring in the power transmission line transfers a signal indicating the fault to the other protective relays via the inter-terminal communication channels, the first communication channel and the second communication channel, and causes the other protective relays to trip circuit breakers installed at each terminal.

To sum up, according to this invention, there is provided a protective relay system for protecting transmission lines, which operates on the current-differential principle and which is well adapted to the protection of a power network having a number of terminals and can easily adjust itself to the increase in the number of such terminals.

Other objects, features and advantages of the invention will become apparent from the following description of the embodiments of the invention taken in conjunction with the accompanying drawings.

DETAILED DESCRIPTION OF THE EMBODIMENTS

Now, a protective relay used for a multi-terminal power line protective relay system according to this invention will be described below in reference to the attached drawings.

Embodiment

Figure 2:
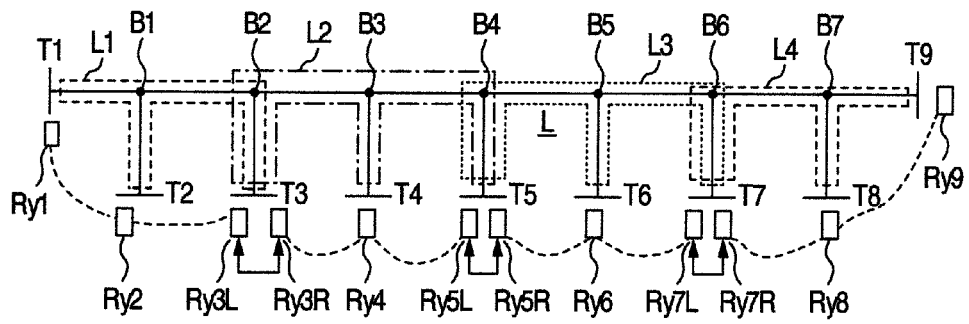
FIG. 2 represents an example of nine-terminal power transmission line as a multi-terminal power transmission line.

In this embodiment, the multi-terminal power transmission line to which a protective relay system according to this invention is to be applied, is supposed to be a power transmission line having four or more terminals. FIG. 2 represents a nine-terminal power transmission line for example. In FIG. 2, T1~T9 denote terminals at electric stations such as power generating stations, substations or loads, and B1~B7 indicate branching points on a power transmission line L. It is to be noted here that the power transmission line is usually of three-phase circuit consisting of three conductors but that, for the sake of simplicity, the three-line structure is reduced to a single-line structure throughout this specification and in the attached drawings.

Protective relays Ry's are installed at terminals T's of respective electric stations. In FIG. 2, numerals 1 through 9 attached to the Ry's of the protective relays are the numbers of the respective terminals. Letters R and L attached also to the symbols mean "right" and "left", respectively. Each of some terminals is provided with a single protective relay Ry whereas each of the other terminals is provided with two protective relays. Description will be given later concerning this difference and their functions.

According to this embodiment, the protection of the multi-terminal power transmission line is performed on, for example, three terminals as one group. In the example represented in FIG. 2, terminals T1, T2, T3 and a portion L1 of a power transmission line L which connects the terminals with one another, are regarded as a unit that is a section where a fault is to be detected. In like manner, terminals T3, T4, T5 and a portion L2 of the power transmission line L which connects the terminals with one another, are regarded as another unit that is another section where another fault is to be detected. When such sectioning is performed, it is to be noted that the neighboring portions L1 and L2 share a terminal (terminal T3 in FIG. 2). Further, the three terminals and the associated portions of the power retransmission line are grouped into like units in each of which a shared terminal is included. In FIG. 2, power line portions L3 and L4 are further sectioned in the same manner. In the following description, the portion of the power transmission line which includes three terminals is referred to as a "power line section".

According to this embodiment, in addition to such sectioning of the power transmission line as described above, wired or wireless communication is performed among the protective relays belonging to each power line section to share electric current detected at any one of the three terminals constituting the power line section in order to achieve protection on the basis of the principle of differential calculation. In FIG. 2, dashed lines connecting the protective relays indicate the wired or wireless communication channels. Communication taking place among the protective relays belonging to each power line section is referred to hereafter as "communication in power line section". Accordingly, on the basis of the principle of differential calculation, the power line section L1 is protected by means of the protective relays Ry1, Ry2, Ry3L, whereas the power line section L2 is protected by means of the protective relays Ry3, Ry4, Ry5L. The same is true of other power line sections L3 and L4.

As a result of sectioning the power transmission line and installing protective relays Ry's, as described above, two protective relays Ry's are provided for each of shared terminals T3, T5, T7. As surmised from the foregoing description, the symbols R and L given to two protective relays associated with each shared terminal signify that the relay bearing the symbol R serves to protect the power line section on the right hand side whereas the relay bearing the symbol L serves to protect the power line section on the left hand side.

Wired communication is executed as indicated by a solid line with arrows on its ends, between two protective relays Ry's associated with each of the shared terminals T3, T5, T7. This wired communication between the two protective relays associated with each of the shared terminals is referred to hereafter as "communication between power line sections". As surmised from the foregoing, according to this embodiment, current detected at each terminal is first shared through the "communication in power line section" so that a fault occurring in a certain power line section is detected on the basis of the principle of differential calculation. Then, the occurrence of the fault is communicated also to other protective relays for other power line sections through the "communication between power line sections", and hence the tripping of the circuit breakers at all the terminals of the multi-terminal power transmission line becomes possible.

Figure 1:
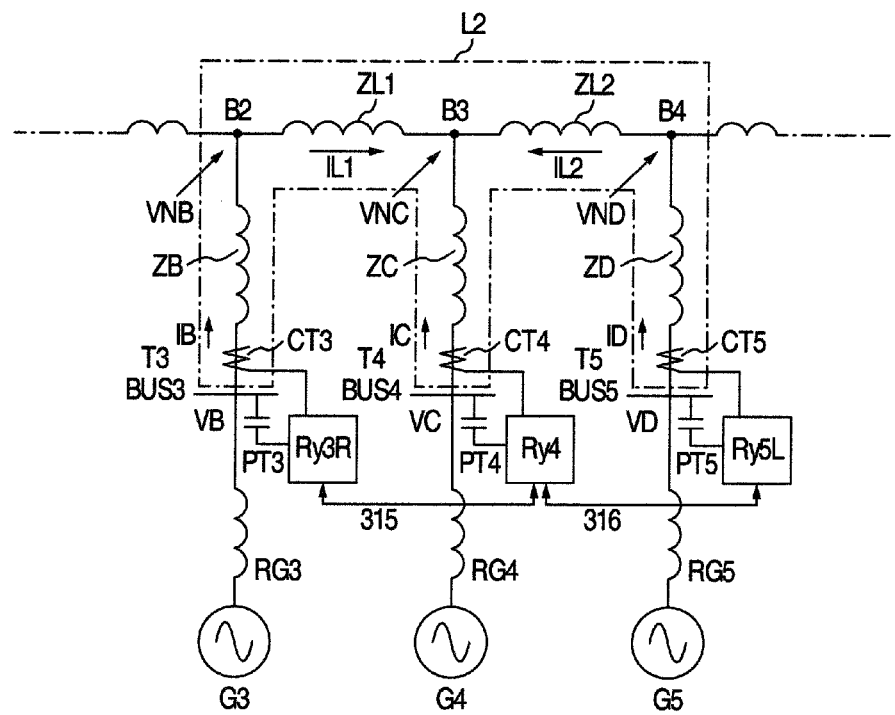
FIG. 1 represents a circuit diagram used for the explanation of the principle on which this invention is based.

FIG. 1 represents a diagram for the explanation of the operations of protective relays performed for each power line section. FIG. 1 represents only the power line section L2 extracted from FIG. 2. At the rear of buses BUS3, BUS4, BUS5 connected to the terminals T3, T4, T5, power sources G3, G4, G5 are provided and have impedances RG3, RG4, RG5 between them. Note that these rear power sources may be replaced by non-power-source loads. Further, branch impedances $Z_B, Z_C, Z_D$ exist between the terminals T3, T4, T5 and the branch points B2, B3, B4 in the power line section, respectively. Moreover, line impedances $Z_{L1}$ and $Z_{L2}$ exist between the branch points B2 and B3 and between the branch points B3 and B4, respectively.

According to this embodiment, in the power system described above, the protective relays Ry3R, Ry4, Ry5L detect terminal currents $I_B, I_C, I_D$ by means of current transformers CT3, CT4, CT5, respectively. In addition, they detect bus voltages $V_B, V_C, V_D$ by means of voltage transformers PT3, PT4, PT5, respectively. Note that the voltages of the buses are measured in the example represented in FIG. 1 but that the voltages on the power transmission line side may be measured as long as they are at the end of the terminals of the power transmission line.

Signal lines 315, 316 are communication channels (wired or wireless) for the communication within a power line section, which enables the protective relays Ry3R, Ry4, Ry5L to share currents detected at the respective terminals. Note that in order to connect each other and to share the currents via the signal lines 315, 316, data with synchronized sampling period must be sent and received among the relays. In doing this, the whole data may be collected by a representative device, or the whole data may be distributed to the entire terminals through mutual data communication.

In the case where a power line section in which a fault occurred is determined in the power network as described above, the range in which each protective relay detects a fault is defined as a range consisting of a region between the current transformer CT3 and the branch point B2, a region between the current transformer CT4 and the branch point B3, a region between the current transformer CT5 and the branch point B4, and a portion of the power line connecting the branch points B2, B3, B4. This region corresponds to the power line section L2 represented in FIG. 1.

Now, description will be made of the principle of calculation employed by the protective relays according to this invention. In case of the multi-terminal power transmission line as represented in FIG. 1, three protective relays Ry's installed at three electric stations obtain data on voltages whose sampling periods are synchronized and data on currents flowing through the power line whose sampling periods are synchronized, at each electric station. These voltages and currents at the terminals T3, T4, T5 are represented by $V_B, V_C, V_D$, and $I_B, I_C, I_D$, respectively.

Note that the determination of a fault is made by each protective relay in this embodiment but that the same operating principle can still hold where determination is made after the data from all the protective relays have been collected by a representative protective relay. Here is described a case where all the protective relays are involved in the fault determination using the communication channels 315, 316.

First, voltages $V_{NB}, V_{NC}, V_{ND}$ at the branch points B2, B3, B4 are calculated on the basis of the data on currents and voltages at the respective terminals. The voltage $V_{NB}$ at the branch point B2 can be derived from a voltage drop as expressed by the equation (1) given below if the impedance $Z_B$ distributed along the power line from the terminal T3 to the branch point B2 is known.

[Equation 1]

$$V_{NB} = V_B - Z_B \cdot I_B \quad (1)$$

It is to be noted here that $V_{NB}, V_B, Z_B$ and $I_B$ are all vector quantities.

In like manner, the voltages $V_{NC}, V_{ND}$ at the branch points B3, B4 can be given by the following Equations (2) and (3).

[Equation 2]

$$V_{NC} = V_C - Z_C \cdot I_C \quad (2)$$

[Equation 3]

$$V_{ND}=V_D-Z_D\cdot I_D \quad (3)$$

Next, currents $I_{L1}$, $I_{L2}$ flowing into the central branch point B3 are calculated by using the voltages $V_{NB}$, $V_{NC}$, $V_{ND}$ at the branch points B2, B3, B4 and the impedances $Z_{L1}$ and $Z_{L2}$ between the branch points.

The current $I_{L1}$ flowing into the branch point B3 from the branch points B2 can be given by the following equation (4) by using the voltages $V_{NB}$, $V_{NC}$ and the impedance $Z_{L1}$.

[Equation 4]

$$I_{L1}=(V_{NB}-V_{NC})/Z_{L1} \quad (4)$$

In like manner, the current $I_{L2}$ flowing into the branch point B3 from the branch point B4 can be obtained by the following equation (5).

[Equation 5]

$$I_{L2}=(V_{ND}-V_{NC})/Z_{L2} \quad (5)$$

If a fault does not exist in the section to be detected, the sum of the currents $I_{L1}$ and $I_{L2}$ should be equal to the power line current $I_C$ measured at the terminal T4. Accordingly, the following equation (6) holds for a normal condition without any fault if the direction of the currents represented by arrows in FIG. 1 is defined as positive.

[Equation 6]

$$I_C+I_{L1}+I_{L2}=0 \quad (6)$$

This result is equivalent to the operating principle on which a three-terminal current-driven differential protective relay operates. Therefore, if the following Equation (7) for an actuating variable $I_d$ and Equation (8) for a suppressing variable $I_R$ are calculated, and the following inequality (9) is calculated by using the equations (7) and (8), then the characteristic of a protective relay of ratio differential type can be realized.

[Equation 7]

$$I_d=|I_C+I_{L1}+I_{L2}| \quad (7)$$

[Equation 8]

$$I_R=|I_C|+|I_{L1}|+|I_{L2}| \quad (8)$$

[Equation 9]

$$I_d \geq K_1\cdot I_R+K_2 \quad (9)$$

In the equation (9), $K_1$ denotes a ratio factor, and $K_2$ is a factor for determining the operating sensitivity.

According to this principle, if data can be obtained on the currents and voltages at the adjacent three terminals, the current differentiation principle can be virtually applied to a fault occurring in the power line section including those portions of power transmission line which are defined between the three terminals and the associated branch points and which are defined between the branch points on the both sides.

The discussion made in reference to FIG. 1 will now be applied to the multi-terminal power transmission line represented in FIG. 2. It is understood that a protective relay which operates on the current differential principle can be realized within the continuum of the power line section including the adjacent three terminals which were sectioned above and portions of power transmission line connecting the three terminals. This reasoning holds equally for the power line sections L1, L2, L3, L4.

According to the conventional current differential principle, in the example represented in FIG. 2, data on the currents whose sampling periods are synchronized with one another at the nine terminals, were needed. According to this embodiment, however, the current differential principle can be applied to every three terminals. Therefore, synchronization is necessary for sampling the current data at the three terminals, but there is no need for the synchronization of current sampling periods for all the nine terminals or for aggregating the data obtained at the nine terminals to a single spot. In other words, the synchronization is necessary only within each power line section while there is no need for the synchronization between individual power line sections. As a result, even if there is an increase in the number of the terminals or the branch points, the current differential principle can be applied without imposing too much burden on the protective relay system.

The basic idea of this invention is as described above, but something must be further taken into consideration in constructing an actual system. To be concrete, measures for avoiding errors must be considered. The currents and voltages obtained from the power system necessarily contain error components. Also, the previously estimated impedances of the portions of the power line are not free from error components. Consequently, a fault occurring near a branch point cannot be detected with high precision.

In order to overcome this difficulty, according to this invention, a fault determining criterion for a distance relay element is adopted to securely detect a fault occurring in an area from each terminal to its associated branch point, in addition to the fault determining criterion for the current-driven differential relay element as described in reference to FIG. 1. If such a distance relay element is used, the above-mentioned area from a terminal to the associated branch point can be treated simply as a two-terminal transmission line. Consequently, errors caused by branching currents and circuitous currents, both characteristic of a multi-terminal network, are eliminated so that high precision can be maintained. Further, according to this invention, since it is only necessary to securely detect an internal fault near each branch point, it suffices that any design which takes an appropriate error margin into consideration should be employed. Moreover, there is no problem in the compatibility among distance relay elements installed at respective terminals.

Figure 3:
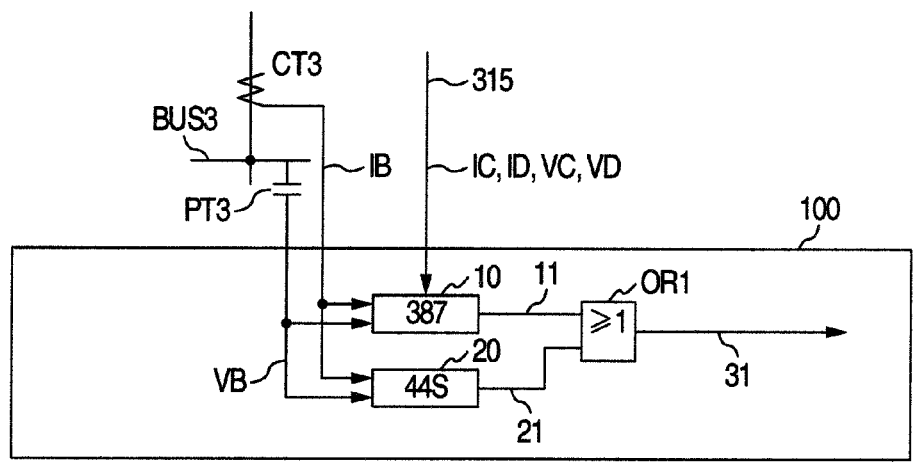
FIG. 3 represents a configuration of a protective relay for detecting a fault occurring in a certain section of a power transmission line.

FIG. 3 represents a block diagram of a protective relay 100 according to this invention, which detects a fault occurring in a power line section and which combines a current-driven differential relay element describe above with a distance relay element covering an area from each terminal near to the associated branch point. In FIG. 3, 10 denotes a current-driven differential relay element operating on the virtual current differential principle described above; 11 denotes the criterion which is the output of the current-driven differential relay element 10 for determining a fault occurring in a power line section; 20 denotes a distance relay element covering an area from a terminal to the associated branch point (i.e. a portion of the power line from the point at which the current transformer CT3 is installed to the branch point B2, concerning the terminal T3 in FIG. 1); and 21 denotes the output of the distance relay element 20. OR1 indicates an OR (i.e. logical sum) circuit.

According to this invention, an OR condition 31 of the logical sum of the criterion 11 for determining the fault occurring in the power line section on the basis of the current differential principle and the criterion 21 for determining the fault occurring in the power line section, is adopted as the condition for detecting a fault occurring in the power line section.

Note that input signals to the relay elements in FIG. 3 are described as follows. In FIG. 3, the protective relay Ry3L for the terminal T3 is taken as an example. Firstly, the distance relay element 20 performs distance calculations by using currants and voltages measured at the associated terminal, i.e. terminal T3.

In contrast to this, the current-driven differential relay element 10 can accept several combinations of inputs. This is because of dependence on whether calculations by using the equation (9) are performed at respective terminals or a representative terminal alone performs such calculations to distribute the result to the other terminals. Also, the type of transmitting information is different, depending on whether the measured terminal currents and voltages, which are to be shared among all the terminals, are transmitted as they are, or they are transmitted after they have been converted to the corresponding power line currents and branch point voltages. In either case, it is necessary to share among the respective terminals the data obtained via the communication channels 315 and 316 of the power line section.

In this embodiment, it is assumed that each terminal is provided with a protective relay 100 represented in FIG. 3, for detecting a fault occurring in a power line section. As represented in FIG. 3, each terminal receives terminal currents and voltages from other terminals, and determines a fault occurring in a power line section with respect to each terminal. Note that the provision of the protective relay 100 alone for each terminal cannot make it possible to trip the circuit breakers installed for all the terminals in FIG. 1. Therefore, description will now be made of how the circuit breakers for all the terminals can be tripped.

When an actual fault occurred in a power line section, the fault cannot be cleared unless not only the circuit breakers associated with the terminals of the power line section in which the fault was detected, but also the circuit breakers associated with all the other terminals of the power transmission line, are tripped. According to this invention, the tripping of all the circuit breakers in the multi-terminal power transmission line can be effectuated by transferring data on the detection of a fault occurring in a power line section from the terminal that detected the fault through the operation of the current-driven differential protective relay 100 to other terminals that detected no faults, that is, by performing the so-called "transfer trip".

In the T3, T5, T7 as described in defining power line sections with reference to FIG. 2, as a result of providing the protective relay at each power line section, two Ry's including the protective relays 100 are installed at the shared terminals T3, T5, T7, and thereby this "transfer trip" can be effectuated by connecting the two protective relays via the communication channel and transferring the signal of the transfer trip.

In this way, by installing two protective relays Ry's each including a relay element for detecting a fault occurring in a power line section, at each terminal which covers two adjacent power line sections, the criterion for determining a fault occurring in a power line section can be transferred or distributed to all the terminals of the power line without using any special communication devices, that is, by successively transferring a signal representing a fault occurring in a power line section from one protective relay to another via simple interfaces such as no-voltage relays.

The way the signal is transferred from one terminal to another will be described in reference to FIG. 2. If a fault occurs in the power line section L2, the protective relays Ry3R, Ry4, Ry5L belonging to the power line section L2 issue trip instructions to their associated circuit breakers and also transfer the criterion for determining the fault occurring in the power line section L2 to adjacent protective relays Ry's.

To be concrete, the protective relay Ry3R installed at the terminal T3 and belonging to the power line section L2 transfers the criterion to the protective relay Ry3L installed at the same terminal T3 and belonging to the power line section L1. The protective relay Ry3L then transfers the criterion to the protective relays Ry1, Ry2 installed at the other terminals T1, T2 which belongs to the same power line section L1. The protective relays Ry1, Ry2 issue in turn instructions for tripping the circuit breakers to the protective relay at the terminals T1, T2.

Further, the protective relay Ry5L installed at the terminal T5 transfers the criterion for determining the fault occurring in the power line section L2 to the protective relay Ry5R installed at the same terminal T5 and belonging to the adjacent power line section L3. The protective relay Ry5R then transfers the criterion to other protective relays Ry6, Ry7L belonging to the same power line section L3. Similarly, the protective relays Ry6, Ry7L issue instructions for tripping the circuit breakers to the terminals T6, T7. Then, the protective relay Ry7L transfers the criterion to the protective relay Ry7R belonging to the power line section L4. Finally, the protective relays Ry8, Ry9 issue instructions for tripping the circuit breakers to the terminal T8, T9, and all the circuit breakers for the terminals T1 though T9 are tripped to eliminate the fault from the power line as a whole.

Figure 4:
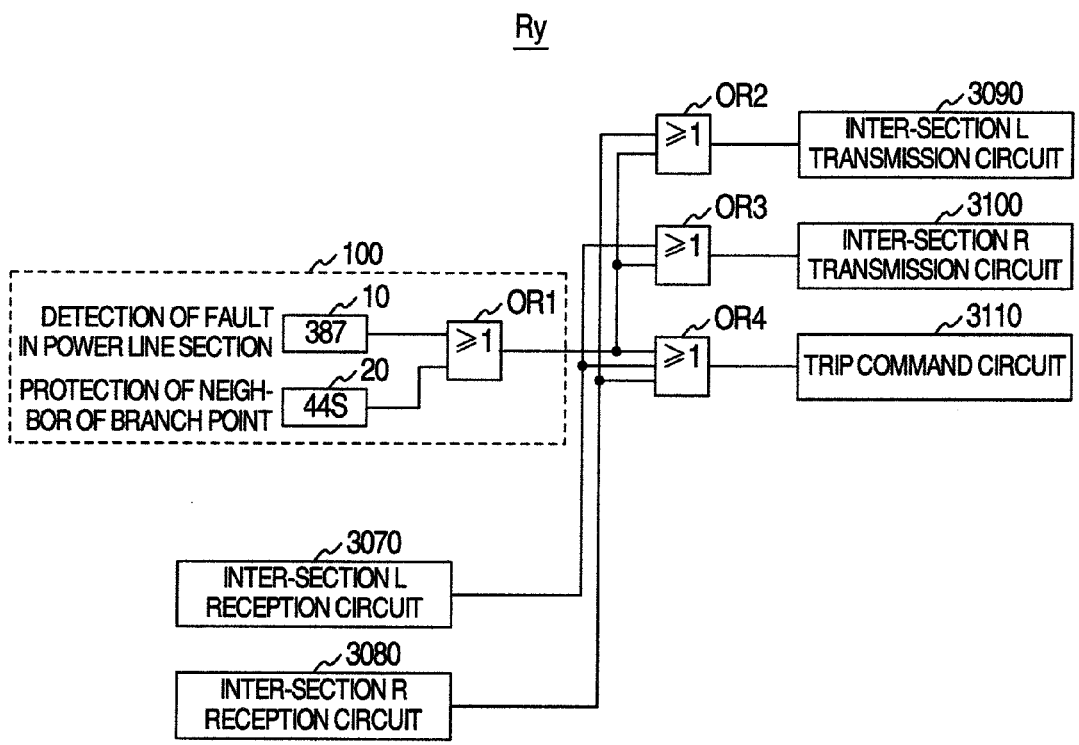
FIG. 4 represents a constitution of protective relays installed at each terminal.

FIG. 4 represents a block diagram of a circuit for explaining the sequence of transferring the above described criterion for determining a fault occurring in a power line section. This circuit configuration is one typically provided as a protective relay installed in the multi-terminal power transmission system. The operation of this circuit is as follows. When a protective relay 100 determines a fault in a specific power line section by itself, the output of the protective relay 100 is sent via an OR circuit OR4 to a command circuit 3110 which executes a tripping process. For example, if a fault occurred in the power line section L2, the protective relays 100 in the protective relays Ry3R, Ry4, Ry5L issue actuating outputs, which are forwarded via the command circuits 3110 and trip the circuit breakers for the terminals T3, T4, T5.

The output of the protective relay 100 for detecting a fault in the power line section L2 is simultaneously sent to an L transmission circuit 3090 for transferring the trip instruction to the adjacent power line section L and also to an R transmission circuit 3100 for transferring the trip instruction to the adjacent power line section R. Here, it should be noted that "adjacent power line section R" signifies "a protective relay side of the terminal located on the right in FIG. 2". For example, in the case of a fault occurring in the power line section L2, the trip instruction is transferred from the protective relay Ry5L located at the rightmost position to the protective relay Ry5R located at the rightmost position. In this case, therefore, the trip instruction is transferred via the communication channel between the protective relays.

In like manner, "transferring the trip signal to the adjacent power line section L" signifies "a protective relay side of the terminal located on the left in FIG. 2". For example, in the case of a fault occurring in the power line section L2, the trip instruction is transferred from the protective relay Ry3R located at the leftmost position to the protective relay Ry3L located at the rightmost position. In this case, therefore, the trip instruction is transferred leftward via the communication channel between the protective relays.

According to the circuit represented in FIG. 4, when a fault occurs in a power line section, each of the three terminals executes the process of tripping its own circuit breaker and then the trip instructions are transferred to the left hand and right hand protective relays Ry's. In the following is described what happens after the transfer of the trip instruction.

In the preceding example, the L reception circuit 3070 receives the trip instruction from the protective relay Ry5L via the intra-terminal communication channel. The trip instruction is sent to the command circuit 3110 via the OR circuit OR4, and a process of tripping the circuit breaker associated with the terminal T5 is executed. In this case, however, since the fault occurred in the power line section L2, the process of tripping the circuit breaker associated with the terminal T5 is already accomplished on the basis of the fault determination by the protective relay Ry5L in advance of the arrival of the trip instruction from the protective relay Ry5L.

The trip instruction received by the L reception circuit 3070 associated with the protective relay Ry5L is also sent directly to the R transmission circuit 3100 associated with the protective relay Ry5L via the OR circuit OR3. Consequently, the trip instruction is transferred also to the protective relay Ry6 installed at the terminal T6 located on the right hand side of the protective relay Ry5L. The explanation of the operation of the protective relay Ry6 installed at the terminal T6 is omitted here since it is easily understood from the foregoing description. Briefly, the circuit breaker tripping signal is successively transferred to the terminals and the protective relays one after another, repeatedly tripping the circuit breakers at the respective terminals.

On the other hand, the R reception circuit 3080 associated with the protective relay Ry3L, which is to receive the trip instruction from the L transmission circuit 3090 associated with the protective relay Ry3R, receives the trip instruction via the intra-terminal communication channel. The trip instruction is then sent to the command circuit 3110 via the OR circuit OR4 to execute the process of tripping the circuit breaker for the terminal T3, but the process of tripping the circuit breaker associated with the terminal T3 is already accomplished on the basis of the fault determination by the protective relay Ry3R.

The trip instruction received by the R reception circuit 3080 associated with the protective relay Ry3L is also sent via the OR circuit OR2 to the L transmission circuit 3090 associated with the protective relay Ry3L. Consequently, the trip instruction is also transferred to the protective relay Ry2 located on the left hand side of the protective relay Ry3L. The explanation of the operation of the protective relay Ry2 installed at the terminal T2 is omitted here since it is easily understood from the foregoing description. Briefly, the circuit breaker tripping signal is successively transferred to the terminals and the protective relays one after another, repeatedly tripping the circuit breakers at the respective terminals.

In the foregoing description, the case was explained where all the circuit breakers on the entire power transmission line are tripped by transferring the trip instruction issued by the rightmost protective relay belonging to a specific power line section in the rightward direction, or by transferring the trip instruction issued by the leftmost protective relay belonging to the same specific power line section in the leftward direction. Actually, however, the trip instruction issued by the rightmost protective relay belonging to a specific power line section may be transferred also in the leftward direction, or the trip instruction issued by the leftmost protective relay belonging to the same specific power line section may be transferred also in the rightward direction. Hence, the circuit breaker associated with the rightmost protective relay Ry first receives the trip instruction issued by the protective relay Ry5L to start the tripping operation, then receives the trip instruction issued by the protective relay Ry4, and finally receives the trip instruction issued by the protective relay Ry3R. This, however, by no means adversely affects the operation of securely tripping circuit breakers.

As described above, the trip instruction is transferred to the extremely right hand or left hand protective relay. The extremely right hand or left hand protective relay lacks some part of the protective relay configuration represented in FIG. 4. In fact, since the protective relay Ry9 located at the extremely right hand end of the power line does not have any protective relay located on its right hand side, it lacks the R reception circuit 3080 and the R transmission circuit 3100. In like manner, since the protective relay Ry1 located at the extremely left hand end of the power line does not have any protective relay located on its left hand side, it lacks the L reception circuit 3070 and the L transmission circuit 3090.

According to this invention, by executing the sequential processing as described above, the future increase in the number of terminals can be coped with, without any change in the existing sequential processing with protective relays for detecting a fault in a power line section.

In the embodiment discussed above, this invention is described as applied to a nine-terminal power transmission line. In what follows, however, description will be made of cases where there are an arbitrary number of terminals, where different types of defining the power line section are employed, and where different types of operating principles on which protective relays Ry work are adopted. The reason for the above consideration is that the division of the power transmission line into power line sections in each of which three terminals are included generates a possibility that some terminal are not included in the power line section.

FIGS. 6A, 6B, 6C and 6D represent cases where four-terminal, five-terminal, six-terminal and seven-terminal power transmission lines are divided into power line sections, respectively. As is clearly seen, the multi-terminal power transmission lines each having an odd number of terminals allow themselves to be divided into power line sections as in the case of the nine-terminal power transmission line represented in FIG. 2. Further, by providing reception circuits and transmission circuit as represented in FIG. 4 and by providing each terminal with the protective relay 100 for detecting a fault occurring in a power line section, the same protective capability can be achieved.

Figure 7:
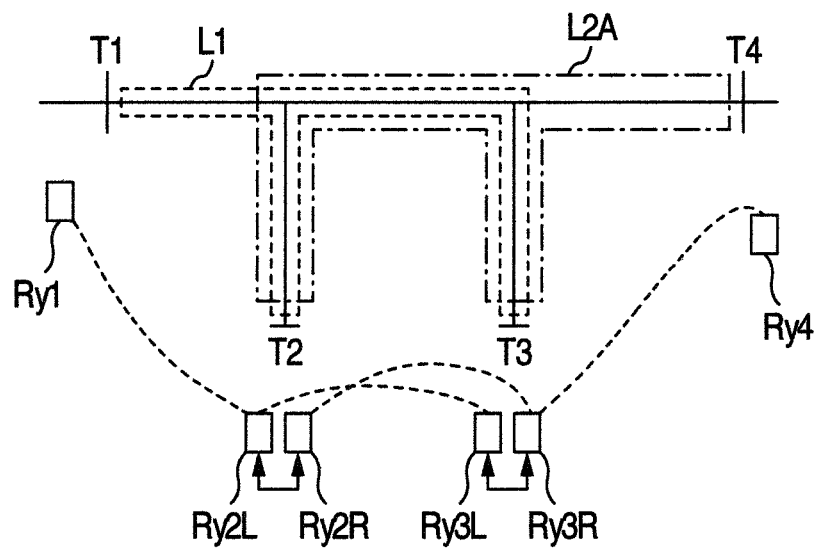
FIG. 7 represents a countermeasure when a surplus terminal is generated.
Figure 8:
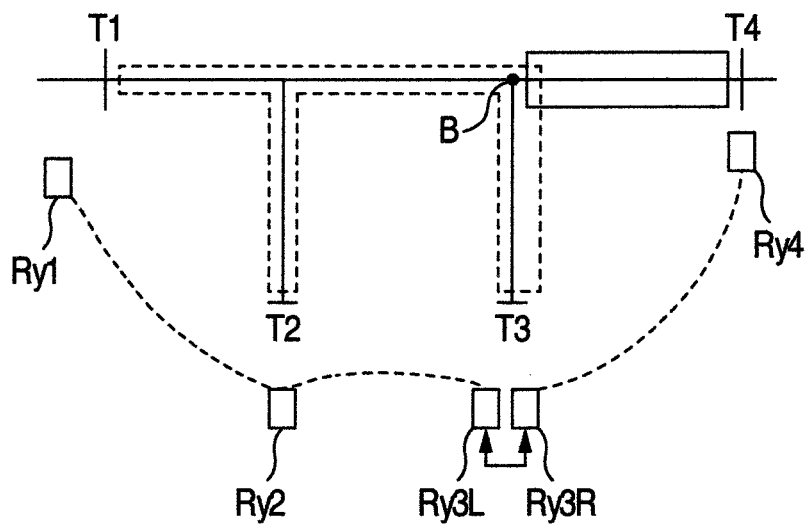
FIG. 8 represents another countermeasure when a surplus terminal is generated.

If a terminal (such as T4 in FIG. 6A, or T6 in FIG. 6C) is excluded from a power line section, the ways of division represented in FIGS. 7 and 8 can be adopted in order to cope with the situations.

FIG. 7 represents the way of dividing a four-terminal power transmission line into a power line section L1 as seen in the foregoing example and another power line section L2A which consists of a terminal T4 that is excluded from the power line section L1. In this case, since the terminals T2, T3 are shared, they are each provided with two protective relays, which are connected with each other by an intra-terminal communication channel arranged between them. Further, inter-terminal communication channels are provided with respect to protective relays Ry1, Ry2L, Ry3L. In like manner, inter-terminal communication channels are provided with respect to protective relays Ry2R, Ry3R, Ry4. In this case, too, as described with reference to FIGS. 3 and 4, it is apparent that the circuit breakers for all the terminals can be tripped by a specific protective relay sending the trip instruction to its own circuit breaker as a result of having detected a fault by itself, or by transferring the trip instruction successively to other protective relays.

FIG. 8 represents a way in which the isolated terminal T4 is not allowed to be assigned to a power line section. Since the protective operation on the principle of current-driven differential operation can not be executed, for such a standard protective relay 100 as represented in FIG. 3, the fault determination is performed by means of the distance relay element 20 alone to detect a fault occurring in that area of the power transmission line from the point where the current transformer CT for the terminal T4 is installed to the branch point B. This configuration alone, however, cannot cope with a fault occurring in another area of the power transmission line, and further cannot transfer the result of the fault determination obtained by the distance relay element 20 to other terminals.

In order to solve this problem, the terminal T3 adjacent to the terminal T4 is designed as a shared terminal, that is, the terminal T3 is provided with two protective relays Ry3L, Ry3R connected with each other via an intra-terminal communication channel. In addition to this, an inter-terminal communication channel is provided between the protective relays Ry3R and Ry4. This communication channel carries only the trip instruction and does not carry data on currents and voltages. Moreover, in this case, since the protective relay Ry3R serves mainly to transfer the trip instruction, it need not operate as the protective relay 100 for detecting a fault occurring in a power line section, as represented in FIG. 2.

Furthermore, according to the above described embodiment of this invention, a single power line section includes three terminals, but more than three terminals may be included in a power line section. The four terminals of the power transmission line represented in FIG. 6A may be so designed as to constitute a single power line section. The use of three-terminal power line sections increases the number of shared terminals in the multi-terminal power transmission line having a great number of terminals. Therefore, from the viewpoint of economy, it is advantageous to employ power line sections each of which includes four or more terminals. In this case, however, there is need for installing communication units each of which is provided with a synchronization control unit and an optical interface, which can adjust themselves to such a four-terminal configuration. Accordingly, this incurs complexity in hardware, increase in difficulty in the control of synchronization, and unavailability of multi-purpose devices. In conclusion, from the practical viewpoint, the power line section consisting of three terminals should be employed.

In this way, the protective relay system for use in the multi-terminal power transmission network according to this invention can achieve the protective operation on the principle of current-driven differential operation, irrespective of the number of terminals. Further, as a natural result of the configuration, it is easy to change the design even if there is need for increasing the number of terminals. That is to say, the increase in the number of terminals can be easily coped with by changing the way of dividing the power transmission line into power line sections, or by changing the way of using the standard circuit represented in FIG. 4.

Figure 5:
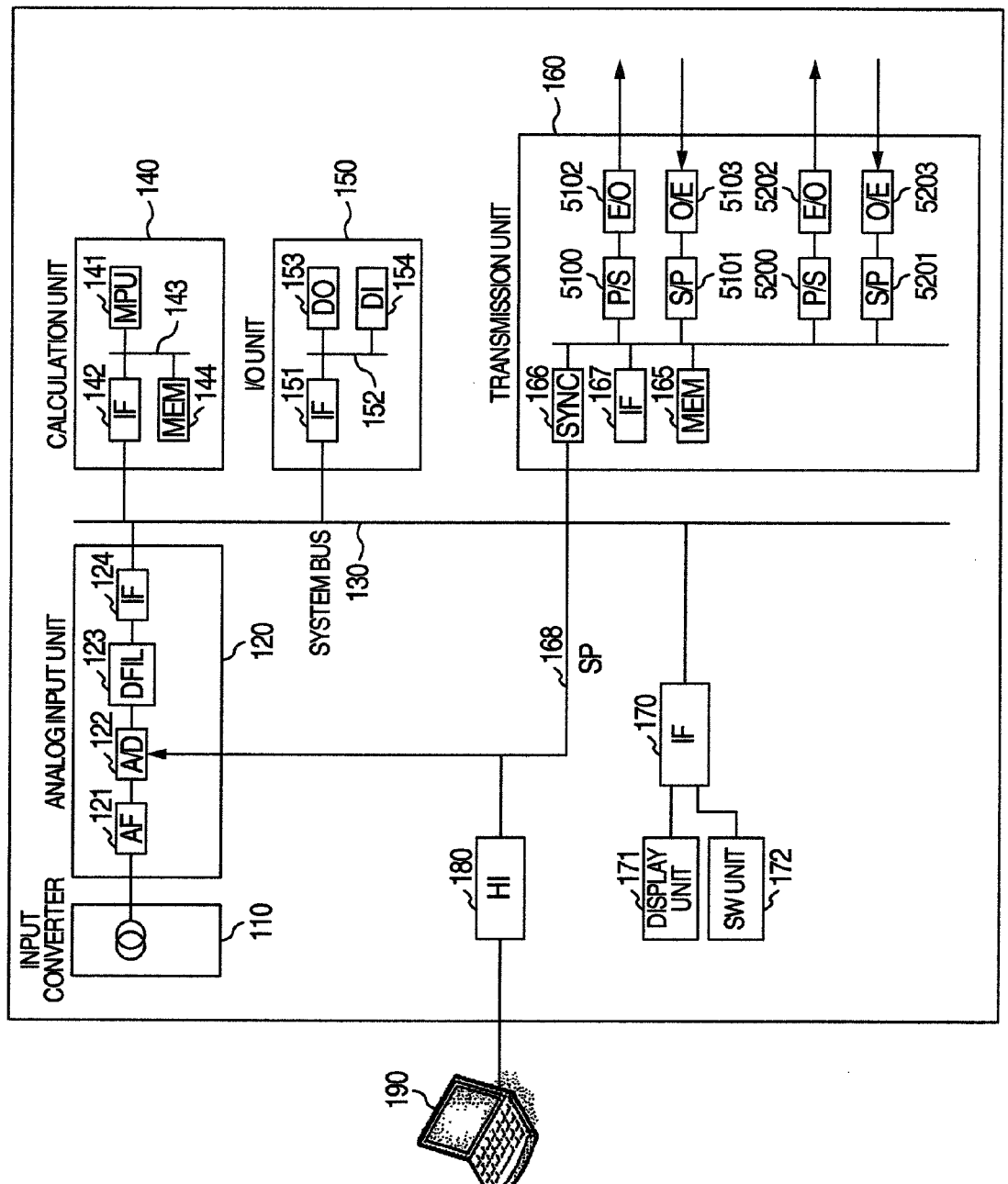
FIG. 5 is a general connection diagram of a digitally operated protective relay.
Figure 6A:
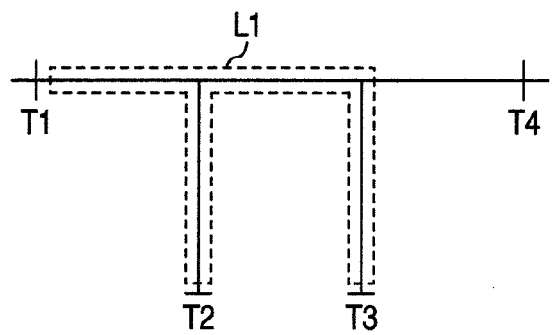
FIG. 6A represents a section for a four-terminal power transmission line.
Figure 6B:
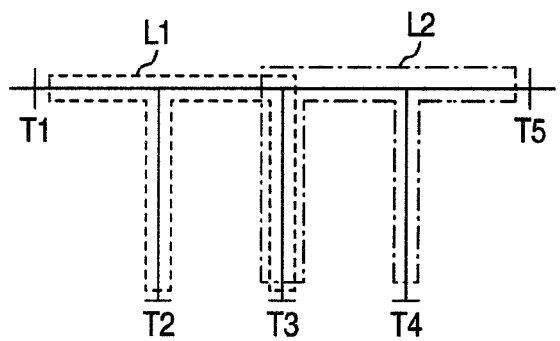
FIG. 6B represents a section for a five-terminal power transmission line.
Figure 6C:
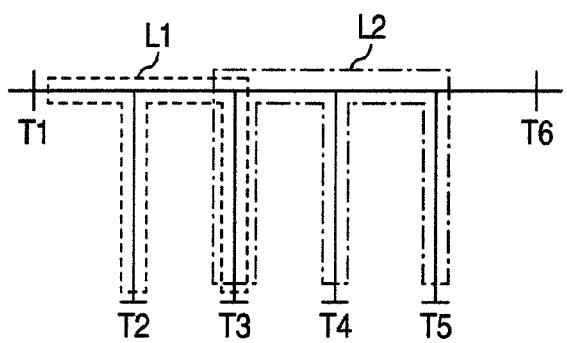
FIG. 6C represents a section for a six-terminal power transmission line.
Figure 6D:
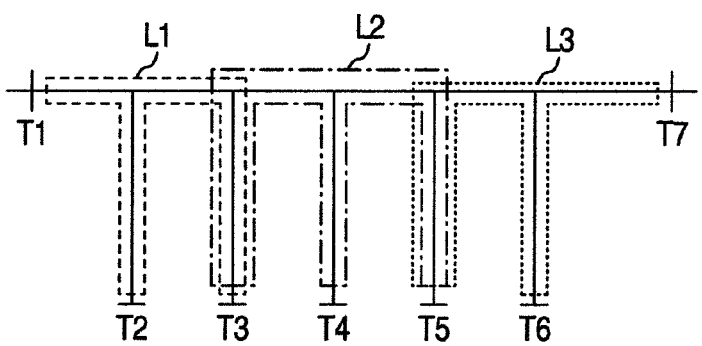
FIG. 6D represents a section for a seven-terminal power transmission line.

FIG. 5 represents a block diagram of a terminal including a protective relay for detecting a fault occurring in the power line section. A numeral 110 denotes an input converter which receives data on currents and voltages from a power network and which has a function of converting the outputs of the voltage and current transformers PT, CT installed in the power network into voltage levels suitable for digital processing. An analog filter 121 is provided for preventing reflection errors and for eliminating higher harmonics. An A/D converter 122 serves to digitalize the data obtained from the power network.

A digital filter 123 has a filtering characteristic of extracting frequency components which are subjected to the calculation by the protective relay.

A system bus 130 links together an arithmetic unit 140, an I/O unit 150, a transmission unit 160, a panel control interface 170 for communication with users, and an interface 180 for communicating with a personal computer 190.

The arithmetic unit 140 consists mainly of a micro processor 141, a memory 144, and a bus interface 142.

The memory 144 may be a non-volatile memory for storing programs or a work memory for storing data temporarily. The I/O unit 150 serves to input the conditions of external devices, to receive data from adjacent protective relays, to control the tripping operation of circuit breakers, and to provide visual displays. In this example, the I/O unit 150 consists mainly of an input circuit 154, an output circuit 153, and a bus interface 151. The transmission unit 160 communicates data with protective relays installed at other electric stations. The data to be communicated include data on voltages and currents obtained from the power network by the protective relays, data on various devices, and signals indicating the occurrence of the fault. In this example, data exchange with terminals of other substations is performed by means of optical interfaces, but the communication may be performed by means of electrical interfaces.

Optical transmission interfaces 5102, 5202 consist mainly of photodiodes, and optical reception interfaces 5103, 5203 consist mainly of photodiodes. Parallel/serial converters 5100, 5200 and serial/parallel converters 5101, 5201 perform signal relaying function between the optical interfaces.

A synchronization control unit 166 performs control on sampling synchronization among terminals each including the protective relay for detecting the fault occurring in the power line section. In this embodiment, it controls sampling synchronization among three terminals. A sampling synchronization signal 168 is generated by the synchronization control unit 166 and transferred as a sampling reference to the analog input unit 120. A memory 165 in the transmission unit 160 serves as a temporary work memory used for sampling synchronization. A bus interface 167 serves to exchange data with the arithmetic unit140. A panel control interface 170 is connected with a display device 171 such as, for example, light-emitting segments, LEDs or LCDs and a switch unit 172 such as, for example, push buttons, in order to realize an interface with users.

Note that the circuit configuration represented in FIG. 5 does not differ much from the circuit configuration of conventional current-driven protective relay of digital type operated on the principle of differential operation and used for detecting the fault occurring in the line section of the power transmission line.

According to this invention, sampling synchronization needs to be taken into consideration only for a group of adjacent three terminals, that is, there is no need for synchronizing sampling timing for all the terminals as is usual with conventional current-driven differential type protective relay system. Consequently, it becomes possible to greatly simplify the communication apparatus involved, and the communication control on the side of the protective relay system as well.

Further, the protective relay system according to this invention comprises a plurality of three-terminal groups each of which is a closed unit having the function of detecting a fault occurring in the power line section of the power transmission line. Accordingly, the addition of extra terminals does not affect the internal processing in the pre-existing protective relay system and therefore no substantial design change is necessary for the future increase in the number of terminals.

When some additional terminals are to be included in the relay system, one or more terminal groups each consisting of three terminals must be involved. A simple type interface capable of exchanging the criterion for determining the fault occurring in the power line section, can be used as an interface with the existing protective relay for detecting the fault occurring in the power line section.

Fundamentally, no matter how many additional terminals are attached to the system, it is possible to detect the fault occurring in the power line section according to the principle described in this specification.

As described above, according to this invention, there is provided a protective relay system for detecting the fault occurring in the line section of the multi-terminal power transmission line, which can easily cope with the increase in the number of protective relays included in the system and which can include as many terminals as desired.

With the recent prevalence of distributed power sources such as wind power generators, trend will be toward the increase in the number of terminals in the power transmission line. Therefore, this invention can cope with the increase in the number of terminals in the power transmission line with a slight addition and change to the existing facility, and is well suited to the trend of terminal multiplication.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A multi-terminal power line protective relay system comprising:
   a power transmission line having four or more terminals which is divided into two or more power line sections, each of which is composed of three adjacent terminals and portions of the power transmission line lying among the three adjacent terminals, and at least one of the three adjacent terminals being shared by two of the adjacent power line sections;
   protective relays installed at the respective terminals included in the power line sections and each including a current-driven differential protective relay element for detecting a fault occurring in a power line section through current-differential calculation by using currents measured at the terminals included in the power line sections;
   inter-terminal communication channels to share data necessary to perform the current-differential calculation in the protective relays; and
   intra-terminal communication channels each linking two protective relays each being installed at a shared terminal being shared by two of the adjacent power line sections;
   wherein each protective relay that detected a fault occurring in a power line section transfers a signal indicating the fault to other protective relays via the inter-terminal and the intra-terminal communication channels and causes the other protective relays to trip circuit breakers installed at the terminals; and
   wherein each protective relay is configured digitally; and current data for the current-driven differential protective relay elements belonging to the same power line section is synchronously sampled, while current data for the current-driven differential protective relay elements belonging to different power line sections is asynchronously sampled.

2. A multi-terminal power line protective relay system comprising:
   a power transmission line having four or more terminals which is divided into two or more power line sections, each of which is composed of three adjacent terminals and portions of the power transmission line lying among the three adjacent terminals, and at least one of the three adjacent terminals being shared by two of the adjacent power line sections;
   protective relays installed at the respective terminals included in the power line sections and each including a current-driven differential protective relay element for detecting a fault occurring in a power line section through current-differential calculation by using currents measured at the terminals included in the power line sections;
   inter-terminal communication channels to share data necessary to perform the current-differential calculation in the protective relays; and
   intra-terminal communication channels each linking two protective relays each being installed at a shared terminal being shared by two of the adjacent power line sections;
   wherein each protective relay that detected a fault occurring in a power line section transfers a signal indicating the fault to other protective relays via the inter-terminal and the intra-terminal communication channels and causes the other protective relays to trip circuit breakers installed at the terminals; and
   wherein the current-driven differential protective relay elements for detecting a fault in a power line section through current-differential calculation by using the currents measured at the terminals belonging to the power line section, estimates a voltage at each branch point associated with each terminal; calculates current flowing into a central branch point from adjacent branch points or current flowing into a terminal corresponding to the central branch point; and detects the fault occurring in the power line section by performing current-differential calculation between the calculated current and the current measured at the terminal corresponding to the central branch point.

3. A multi-terminal power line protective relay system comprising:
   a power transmission line having four or more terminals which is divided into a power line section composed of three adjacent terminals and portions of the power transmission line lying among the three adjacent terminals, at least one terminal being excluded from the power line section;
   a first group of protective relays installed at the respective terminals included in the power line sections and each including a current-driven differential protective relay element for detecting a fault occurring in a power line section through current-differential calculation by using currents measured at the terminals included in the power line sections;
   inter-terminal communication channels to share data necessary to perform the current-differential calculation in the first group of protective relays;
   a second protective relay installed at a terminal excluded from the power line section and including a distance relay element having its measurement area from the excluded terminal to a branch point associated with the excluded terminal;

a third protective relay installed at the terminal of the first group adjacent to the excluded terminal;

a first communication channel for communication between one of the first group protective relays installed at the terminal adjacent to the excluded terminal and the third protective relay; and a second communication channel for communication between the second protective relay and the third protective relay, wherein each protective relay that detected a fault occurring in the power transmission line transfers a signal indicating the fault to the other protective relays via the inter-terminal communication channels, the first communication channel and the second communication channel, and causes the other protective relays to trip circuit breakers installed at each terminal.

* * * * *